(12) United States Patent
Sumiya et al.

(10) Patent No.: US 11,814,293 B2
(45) Date of Patent: Nov. 14, 2023

(54) DIAMOND POLYCRYSTAL, TOOL INCLUDING DIAMOND POLYCRYSTAL, AND METHOD OF PRODUCING DIAMOND POLYCRYSTAL

(71) Applicant: Sumitomo Electric Industries, Ltd., Osaka (JP)

(72) Inventors: Hitoshi Sumiya, Osaka (JP); Katsuko Yamamoto, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1089 days.

(21) Appl. No.: 16/489,641

(22) PCT Filed: Oct. 1, 2018

(86) PCT No.: PCT/JP2018/036706
§ 371 (c)(1),
(2) Date: Aug. 28, 2019

(87) PCT Pub. No.: WO2020/070776
PCT Pub. Date: Apr. 9, 2020

(65) Prior Publication Data
US 2021/0032112 A1    Feb. 4, 2021

(51) Int. Cl.
*C01B 32/25*  (2017.01)
*C01B 32/26*  (2017.01)
*B23B 27/20*  (2006.01)

(52) U.S. Cl.
CPC .............. *C01B 32/26* (2017.08); *B23B 27/20* (2013.01); *C01B 32/25* (2017.08); *C01P 2002/60* (2013.01); *C01P 2002/76* (2013.01); *C01P 2006/90* (2013.01)

(58) Field of Classification Search
CPC .................................................. C01B 32/25
See application file for complete search history.

(56) References Cited

U.S. PATENT DOCUMENTS

2012/0258035 A1    10/2012  Sumiya et al.

FOREIGN PATENT DOCUMENTS

| CN | 104209062 A | 12/2014 |
| JP | 2014-091661 A | 5/2014 |
| JP | 2016087481 A | 5/2016 |
| WO | 2012023473 A1 | 2/2012 |

OTHER PUBLICATIONS

Dubrovinskaia et al., "Nanocrystalline diamond synthesized from C60", Diamond & Related Materials, 2005, 14, pp. 16-22.
Sumiya et al., "Optical Characteristics of Nano-Polycrystalline Diamond Synthesized Directly from Graphite under High Pressure and High Temperature", Japanese Journal of Applied Physics, 2009, 48, 120206.
Kazuhiro Ikeda, Hitoshi Sumiya, Properties of ultra-pure nano polycrystalline diamonds, 26th Diamond Symposium Program Abstract, 2012, pp. 220-221. [Cited in the Written Opinion of PCT/JP2018/036706].
Written Opinion of the International Search Authority for International Application No. PCT/JP2018/036706, 10 pages, dated Nov. 16, 2018.
Xu et al., "Nano-Polycrystalline Diamond Formation Under Ultra-High Pressure," International Journal of Refractory Metals and Hard Materials, vol. 36, Jan. 1, 2013, pp. 232-237. [Cited in Communication in EP Application dated Apr. 19, 2022.]
Youliao Zheng et al., "China's Strategic Emerging Industry-New Materials: The Third Generation of Semiconductor Materials," China Railway Publishing House, 1st edition, 2017, pp. 251-252.
Zhifeng Zhao et al., "Process Foundation of Carbon Material," Harbin Institute of Technology Press, 1st edition, 2017, pp. 14-15.
Notification of the First Office Action issued in counterpart Chinese Patent Application No. 201880026144.0 dated Sep. 2, 2021.
Office Action issued in counterpart Korean Application No. 519980961696 dated Mar. 20, 2023.
Hitoshi Sumiya et al., "High Pressure Synthesis of High-Purity Polycrystalline Diamonds by Direct Conversion from Various Carbon Materials and their Characterization," vol. 16, No. 3, (2006), pp. 207-215.
Office Action issued in counterpart Korean Application No. 10-2019-7028276 dated Mar. 20, 2023.

*Primary Examiner* — Stuart L Hendrickson
(74) *Attorney, Agent, or Firm* — McCarter & English, LLP; Michael A. Sartori

(57) ABSTRACT

A diamond polycrystal includes diamond grains, the diamond polycrystal including a cubic diamond and a 6H type hexagonal diamond, wherein the cubic diamond and the 6H type hexagonal diamond exist in the same or different diamond grains, and a ratio $Ab_1/Ab_2$ is more than or equal to 0.4 and less than or equal to 1, $Ab_1$ representing a maximum value of absorption in a range of more than or equal to 1200 $cm^{-1}$ and less than or equal to 1300 $cm^{-1}$ in an infrared absorption spectrum, $Ab_2$ representing a maximum value of absorption in a range of more than or equal to 1900 $cm^{-1}$ and less than or equal to 2100 $cm^{-1}$.

5 Claims, 1 Drawing Sheet

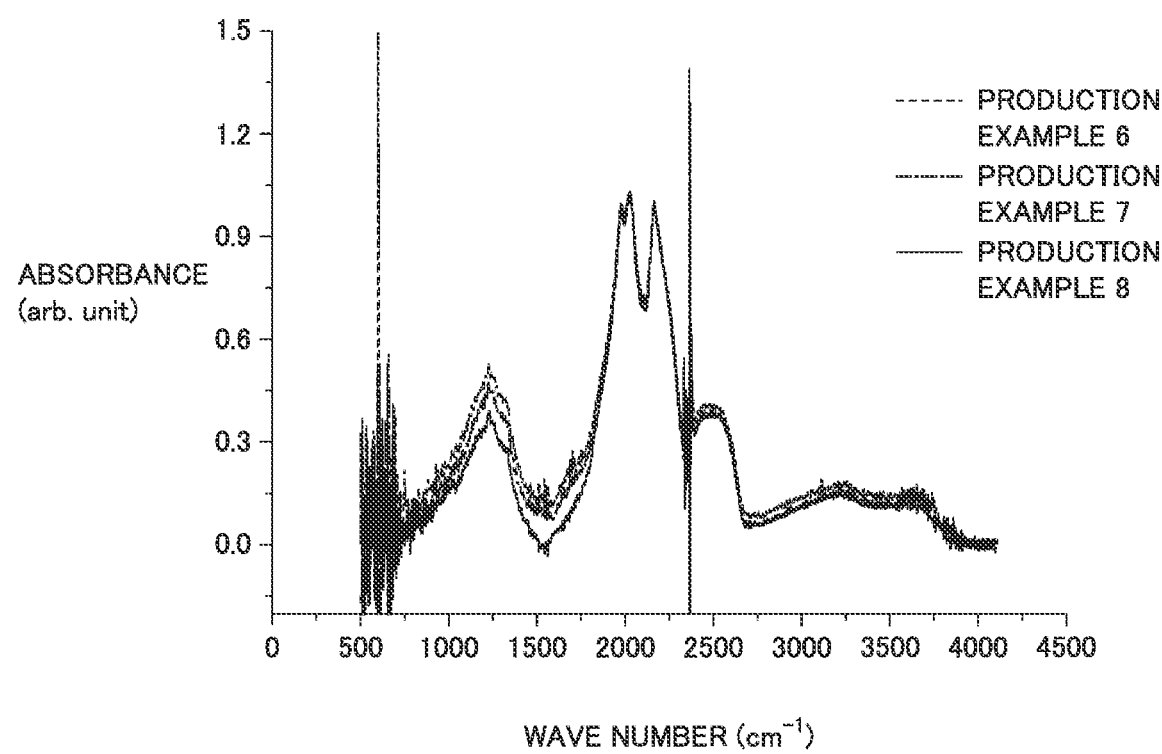

DIAMOND POLYCRYSTAL, TOOL INCLUDING DIAMOND POLYCRYSTAL, AND METHOD OF PRODUCING DIAMOND POLYCRYSTAL

TECHNICAL FIELD

The present disclosure relates to a diamond polycrystal, a tool including the diamond polycrystal, and a method of producing the diamond polycrystal.

BACKGROUND ART

A diamond polycrystal has an excellent hardness, has no directional property in hardness, and has no cleavability. Hence, the diamond polycrystal is widely used for tools such as a cutting bite, a dresser, and a die, as well as a drill bit and the like.

A conventional diamond polycrystal is obtained by sintering a diamond powder, which is a source material, together with a sintering aid or a binder at high pressure and high temperature (generally, the pressure is about 5 to 8 GPa, and the temperature is about 1300 to 2200° C.) at which diamond is thermodynamically stable. Examples of the sintering aid usable include: an iron-group element metal such as Fe, Co, or Ni; a carbonate such as $CaCO_3$; and the like. Examples of the binder usable include ceramics such as SiC.

The diamond polycrystal obtained by the above-described method includes the sintering aid or the binder. The sintering aid and the binder can cause decreases in mechanical properties, such as hardness and strength, or heat resistance of the diamond polycrystal.

The following diamond polycrystals have been also known: a diamond polycrystal in which a sintering aid has been removed by acid treatment; and a diamond polycrystal using heat-resistant SiC as a binder to achieve an excellent heat resistance. However, these diamond polycrystals have low hardnesses or low strengths, and therefore have insufficient mechanical properties as tool materials.

Meanwhile, a non-diamond-like carbon material, such as graphite, glassy carbon, amorphous carbon, or onion-like carbon, can be directly converted into diamond at very high pressure and temperature without using a sintering aid and the like. A diamond polycrystal is obtained by performing sintering at the same time as directly converting from the non-diamond phase to the diamond phase (N. Dubrovinskaia et al., Diamond & Related Materials, 14 (2005) 16-22 (Non-Patent Literature 1); H. Sumiya et al., Japanese Journal of Applied Physics 48 (2009) 120206 (Non-Patent Literature 2)).

CITATION LIST

Patent Literature

PTL 1: WO 2012/023473

Non Patent Literature

NPL 1: N. Dubrovinskaia et al., Diamond & Related Materials, 14 (2005) 16-22
NPL 2: H. Sumiya et al., Japanese Journal of Applied Physics 48 (2009) 120206

SUMMARY OF INVENTION

A diamond polycrystal of the present disclosure is a diamond polycrystal including diamond grains, the diamond polycrystal including a cubic diamond and a 6H type hexagonal diamond, wherein
the cubic diamond and the 6H type hexagonal diamond exist in the same or different diamond grains, and
a ratio $Ab_1/Ab_2$ is more than or equal to 0.4 and less than or equal to 1, $Ab_1$ representing a maximum value of absorption in a range of more than or equal to 1200 $cm^{-1}$ and less than or equal to 1300 $cm^{-1}$ in an infrared absorption spectrum, $Ab_2$ representing a maximum value of absorption in a range of more than or equal to 1900 cm and less than or equal to 2100 $cm^{-1}$.

A tool of the present disclosure includes the above-described diamond polycrystal.

A method of producing a diamond polycrystal in the present disclosure includes:
preparing, as a starting material, a non-diamond-like carbon material having a degree of graphitization of less than or equal to 0.6;
when assuming that a pressure is represented as P (GPa) and a temperature is represented as T (° C.), increasing the pressure and the temperature simultaneously at a pressure increasing rate of more than or equal to 0.2 GPa/minute and less than or equal to 20 GPa/minute and a temperature increasing rate of more than or equal to 300° C./minute and less than or equal to 3000° C./minute, from a starting pressure and a starting temperature satisfying P≤10 and 0≤T≤100 to a sintering pressure and a sintering temperature satisfying $10 < P \leq 25$  Formula (1), $1000 < T \leq 2500$  Formula (2), $P \geq 0.000097 T^2 - 0.422 T + 471$  Formula (3), and $P \leq 0.000113 T^2 - 0.541 T + 663$  Formula (4); and at the sintering pressure and the sintering temperature, converting the non-diamond-like carbon material into diamond grains and performing sintering.

BRIEF DESCRIPTION OF DRAWINGS

FIG. 1 is a graph showing an infrared absorption spectrum of a diamond polycrystal.

DETAILED DESCRIPTION

Problem to be Solved by the Present Disclosure

When the diamond polycrystal of each of Non-Patent Literature 1 to Non-Patent Literature 3 is applied to a cutting tool or the like, a cutting edge thereof tends to be broken, thus resulting in a problem in terms of a breakage resistance, a cracking resistance, and the like.

The present disclosure has been made in view of the above-described circumstance, and has an object to provide: a diamond polycrystal having an excellent breakage resistance while maintaining a high hardness; a tool including the diamond polycrystal; and a method of producing the diamond polycrystal.

Advantageous Effect of the Present Disclosure

According to the present disclosure, there can be provided: a diamond polycrystal having an excellent breakage resistance while maintaining a high hardness; a tool including the diamond polycrystal; and a method of producing the diamond polycrystal.

DESCRIPTION OF EMBODIMENTS

First, embodiments of the disclosure of the present application are listed and described.

[1] A diamond polycrystal according to one embodiment of the present disclosure is a diamond polycrystal including diamond grains, the diamond polycrystal including a cubic diamond and a 6H type hexagonal diamond, wherein the cubic diamond and the 6H type hexagonal diamond exist in the same or different diamond grains, and a ratio $Ab_1/Ab_2$ is more than or equal to 0.4 and less than or equal to 1, $Ab_1$ representing a maximum value of absorption in a range of more than or equal to 1200 $cm^{-1}$ and less than or equal to 1300 $cm^{-1}$ in an infrared absorption spectrum, $Ab_2$ representing a maximum value of absorption in a range of more than or equal to 1900 $cm^{-1}$ and less than or equal to 2100 $cm^{-1}$.

The diamond polycrystal has an excellent breakage resistance while maintaining a high hardness.

[2] The 6H type hexagonal diamond exists in a form of a layer in each of corresponding diamond grains. By defining in this way, the diamond polycrystal has a more excellent crack propagation resistance.

[3] The diamond polycrystal has a Knoop hardness of more than or equal to 100 GPa and less than or equal to 150 GPa at a room temperature. By defining in this way, the diamond polycrystal has a more excellent hardness.

[4] An average grain size of the diamond grains is more than or equal to 1 nm and less than or equal to 60 nm. By defining in this way, the diamond polycrystal has a more excellent cracking resistance in addition to the breakage resistance.

[5] A tool according to one embodiment of the present disclosure includes the diamond polycrystal recited in any one of [1] to [4].

The tool has an excellent breakage resistance in processing various types of materials.

[6] A method of producing a diamond polycrystal according to one embodiment of the present disclosure includes:

preparing, as a starting material, a non-diamond-like carbon material having a degree of graphitization of less than or equal to 0.6;

when assuming that a pressure is represented as P (GPa) and a temperature is represented as T (° C.), increasing the pressure and the temperature simultaneously at a pressure increasing rate of more than or equal to 0.2 GPa/minute and less than or equal to 20 GPa/minute and a temperature increasing rate of more than or equal to 300° C./minute and less than or equal to 3000° C./minute, from a starting pressure and a starting temperature satisfying P≤10 and 0≤T≤100 to a sintering pressure and a sintering temperature satisfying $10 < P \leq 25$      Formula (1), $1000 < T \leq 2500$      Formula (2), $P \geq 0.000097T^2 - 0.422T + 471$      Formula (3), and $P \leq 0.000113T^2 - 0.541T + 663$      Formula (4); and at the sintering pressure and the sintering temperature, converting the non-diamond-like carbon material into diamond grains and performing sintering.

With the production method, a diamond polycrystal having an excellent breakage resistance while maintaining a high hardness can be produced.

[7] The non-diamond-like carbon material includes low-crystalline graphite, pyrolytic graphite, or amorphous carbon. By defining in this way, the diamond polycrystal having a more excellent cracking resistance can be produced.

Details of Embodiments of the Present Disclosure

The following describes details of the embodiments of the present disclosure. It should be noted that the present disclosure is not limited to these illustrated examples. Here, in the present specification, the expression "A to B" represents a range of lower to upper limits (i.e., more than or equal to A and less than or equal to B). When no unit is indicated for A and a unit is indicated only for B, the unit of A is the same as the unit of B.

<<Diamond Polycrystal>>

A diamond polycrystal according to the present embodiment is a diamond polycrystal including diamond grains.

the diamond polycrystal including a cubic diamond and a 6H type hexagonal diamond, wherein the cubic diamond and the 6H type hexagonal diamond exist in the same or different diamond grains, and a ratio $Ab_1/Ab_2$ is more than or equal to 0.4 and less than or equal to 1, $Ab_1$ representing a maximum value of absorption in a range of more than or equal to 1200 $cm^{-1}$ and less than or equal to 1300 $cm^{-1}$ in an infrared absorption spectrum, $Ab_e$ representing a maximum value of absorption in a range of more than or equal to 1900 $cm^{-1}$ and less than or equal to 2100 $cm^{-1}$.

The diamond polycrystal includes diamond grains. That is, the diamond polycrystal is basically composed of diamond in the form of grains and does not substantially include a binder phase (binder) constituted of one or both of a sintering aid and a binder. Therefore, the diamond polycrystal has very high hardness and strength. Moreover, in the diamond polycrystal, even under a high-temperature condition, deteriorated mechanical properties and degranulations are avoided, both of which would have been otherwise caused due to a difference from the binder in thermal expansion coefficient or a catalytic action of the binder. Moreover, in one aspect of the present embodiment, it is also understandable that the diamond grains are crystal grains of the diamond.

The diamond polycrystal is a polycrystal composed of a plurality of diamond grains. Hence, the diamond polycrystal does not have a directional property (anisotropy) and cleavability unlike a single crystal, and has isotropic hardness and wear resistance in all the directions.

The diamond polycrystal in the present disclosure is defined by absence of a diffraction peak that originates from a structure other than a diamond structure and that has an integrated intensity of more than 10% with respect to a total of integrated intensities of all the diffraction peaks originating from the diamond structure in an X-ray diffraction spectrum obtained by an X-ray diffraction method. That is, with the X-ray diffraction spectrum, it can be confirmed that the diamond polycrystal does not include the above-described binder phase. The integrated intensity of the diffraction peak is a value excluding a background. The X-ray diffraction spectrum can be obtained by the following method.

The diamond polycrystal is ground by a diamond wheel, and a processed surface thereof is regarded as an observed surface.

An X-ray diffractometer ("MiniFlex600" (trademark) provided by Rigaku) is used to obtain an X-ray diffraction spectrum of the cut surface of the diamond polycrystal. Conditions for the X-ray diffractometer on this occasion are, for example, as follows.

Characteristic X ray: Cu-Kα (wavelength of 1.54 Å)
Tube voltage: 45 kV
Tube current: 40 mA
Filter: multilayer mirror
Optical system: concentration method
X-ray diffraction method: θ-2θ method.

The diamond polycrystal may include an inevitable impurity as long as the effect of the present embodiment is exhibited. Examples of the inevitable impurity include: less than or equal to 1 ppm of hydrogen; less than or equal to 1 ppm of oxygen; less than or equal to 0.1 ppm of nitrogen; and the like. In the present specification, the concentration of the inevitable impurity means a concentration thereof that is based on the number of atoms.

Each of the concentrations of hydrogen, oxygen, and nitrogen in the diamond polycrystal is preferably less than or equal to 1 ppm, and is more preferably less than or equal to 0.1 ppm in order to improve strength. Moreover, a total impurity concentration in the diamond polycrystal is preferably less than or equal to 3 ppm, and is more preferably less than or equal to 0.3 ppm. Although the lower limit value of each of the concentrations of hydrogen, oxygen, and nitrogen in the diamond polycrystal is not particularly limited, the lower limit value may be more than or equal to 0.001 ppm in view of production.

Each of the concentrations of hydrogen, oxygen, and nitrogen in the diamond polycrystal can be measured by secondary ion mass spectrometry (SIMS). As a measurement method, each of the impurity concentrations is measured, for example, in the following manner: "CAMECA IMS-7f" (provided by Ametek) is used for a device; $Cs^+$ is set to primary ion species; a primary acceleration voltage is set to 15.0 kV; and a detection region is set to φ30 μm.

The diamond polycrystal of the present embodiment is a sintered material, but, in many cases, the term "sintered material" usually implies that a binder is included, so that the term "polycrystal" is used in the present embodiment.

<Diamond Grains>

The average grain size of the diamond grains is preferably less than or equal to 60 nm. The diamond polycrystal composed of the diamond grains having such a small average grain size is suitably applicable to a tool required to have a tough and high-precision cutting edge, such as tools for high-load processing, micro-processing, and the like. If the average grain size of the diamond grains is more than 60 nm, when used for a processing tool, a cutting edge thereof is deteriorated in precision and is more likely to be broken. Therefore, such diamond grains are not applicable to a tool for precision processing under a high load.

In order to suitably apply the diamond polycrystal to a tool required to have a tough and high-precision cutting edge, the average grain size of the diamond grains is more preferably less than or equal to 50 nm and is further preferably less than or equal to 20 nm. For this purpose, the average grain size of the diamond grains may be less than or equal to 15 nm.

In order to obtain a mechanical strength specific to diamond, the lower limit value of the average grain size of the diamond grains is preferably more than or equal to 1 nm. For this purpose, the average grain size of the diamond grains may be more than or equal to 10 nm or may be more than or equal to 15 nm.

The average grain size of the diamond grains is preferably more than or equal to 1 nm and less than or equal to 60 nm, is more preferably more than or equal to 10 nm and less than or equal to 50 nm, and is further preferably more than or equal to 15 nm and less than or equal to 40 nm.

The average grain size of the diamond grains can be determined by performing, using a scanning electron microscope (SEM), image observation of a surface of the diamond polycrystal that has been finished to be a flat mirror surface by polishing. A specific method thereof is as follows.

The surface of the diamond polycrystal finished to be a flat mirror surface by polishing with a diamond wheel or the like is observed at a magnification of ×1000 to ×100000 using a high-resolution scanning electron microscope, thereby obtaining a SEM image. As the high-resolution scanning electron microscope, it is preferable to use a field-emission scanning electron microscope (FE-SEM), for example.

Next, a circle is drawn on the SEM image and then eight straight lines are drawn from the center of the circle to the outer circumference of the circle in a radial manner (in such a manner that intersecting angles between the straight lines become substantially equal to one another). In this case, the observation magnification and the diameter of the circle are preferably set such that the number of diamond grains (crystal grains) on each straight line becomes about 10 to 50.

Next, the number of crystal grain boundaries of the diamond grains crossed by each of the straight lines is counted, and then the length of the straight line is divided by the number thereof to find an average intercept length. A numerical value obtained by multiplying the found average intercept length by 1.128 is regarded as the average grain size. The average grain size is determined for each of three SEM images in the above-described manner, and the average value of the average grain sizes of the three images is regarded as "the average grain size of the diamond grains".

An aspect ratio (Rl/Rs) of a major axis Rl and a minor axis Rs of each diamond grain in the SEM image is preferably 1≤Rl/Rs<4 in order to suppress occurrence of minute cracks. Here, the major axis refers to a distance between two points separated the most from each other on the contour line of a diamond grain. The minor axis refers to a distance of a straight line that is orthogonal to the straight line defining the major axis and that has the longest distance between two intersections with the contour of the diamond grain.

<Cubic Diamond and Hexagonal Diamond>

The diamond polycrystal according to the present embodiment includes a cubic diamond and a 6H type hexagonal diamond. The cubic diamond and the 6H type hexagonal diamond exist in the same or different diamond grains. Here, the "cubic diamond" refers to a diamond having a cubic crystal structure. On the other hand, the "hexagonal diamond" refers to a diamond having a hexagonal crystal structure. The "6H type hexagonal diamond" refers to a hexagonal diamond in which a crystal plane structure is repeated at six cycles in a stacking direction. When an appropriate amount of stacking faults exist in each of the diamond grains, a crystal structure corresponding to the 6H type hexagonal diamond is produced. Existence of such a crystal structure in each of corresponding diamond grains tends to prevent progress of plastic deformation or progress of crack in the diamond grain, thereby suppressing cleavability. Accordingly, the diamond grains become tougher, thus resulting in an improved cracking resistance as a diamond polycrystal. As a result, when the diamond polycrystal is used for tools such as a cutting tool, the breakage resistance of the tool is improved greatly, thus resulting in improved practical performance.

The 6H type hexagonal diamond preferably exists in the form of a layer in each of the corresponding diamond grains. Such a diamond polycrystal has a more excellent breakage resistance. Whether or not the 6H type hexagonal diamond exists in the form of a layer in each of the corresponding diamond grains can be confirmed by using a transmission electron microscope, for example.

It should be noted that a 2H type hexagonal diamond (hexagonal diamond in which a crystal plane structure is repeated at two cycles in a stacking direction) may be generated; however, when a small amount (for example, less than or equal to 1 volume %) of the 2H type hexagonal diamond is generated, the 2H type hexagonal diamond is dispersed in a grain boundary or triple point of a grain including the 6H type hexagonal diamond in its crystal lattice, so that mechanical characteristics are not affected greatly. However, if 2H type hexagonal diamond grains included therein are partially aggregated, the polycrystal tends be broken therefrom to result in a decreased breaking strength.

The cubic diamond and the hexagonal diamond are identified in accordance with a diffraction peak pattern obtained through X-ray diffraction. That is, in the X-ray diffraction of the diamond polycrystal including the cubic diamond and the hexagonal diamond, a mixed pattern of the diffraction peak pattern of the cubic diamond and the diffraction peak pattern of the hexagonal diamond is obtained.

The existence of the 6H type hexagonal diamond can be confirmed in accordance with a pattern of an infrared absorption spectrum described tater. On the other hand, the 2H type hexagonal diamond is infrared inactive and does not appear in the infrared absorption spectrum.

<Infrared Absorption Spectrum>

In the diamond polycrystal according to the present embodiment, ratio $Ab_1/Ab_2$ is more than or equal to 0.4 and less than or equal to 1, and is preferably more than or equal to 0.42 and less than or equal to 0.85, $Ab_1$ representing the maximum value of absorption in the range of more than or equal to 1200 $cm^{-1}$ and less than or equal to 1300 $cm^{-1}$ in the infrared absorption spectrum, $Ab_2$ representing the maximum value of absorption in the range of more than or equal to 1900 $cm^{-1}$ and less than or equal to 2100 $cm^{-1}$. The 6H type hexagonal diamond exhibits absorption in a range of more than or equal to 1200 $cm^{-1}$ and less than or equal to 1300 $cm^{-1}$ in the infrared absorption spectrum. Hence, the existence of the 6H type hexagonal diamond can be confirmed in accordance with presence/absence of the absorption.

The infrared absorption spectrum is measured in the present embodiment as follows.

First, the infrared absorption spectrum of the diamond polycrystal, which is a sample, is measured using a Fourier transform infrared spectrophotometer (FT-IR) in a range of more than or equal to 500 $cm^{-1}$ and less than or equal to 4000 $cm^{-1}$. Next, in the obtained infrared absorption spectrum, a baseline is set such that the absorption spectrum of a wave number region in which absorption by structure defects or impurities of the diamond is not seen (for example, region of more than or equal to 4000 $cm^{-1}$ and less than or equal to 4050 $cm^{-1}$) becomes 0. In the infrared absorption spectrum with the baseline being set, maximum value $Ab_1$ of absorption (absorption by the 6H type hexagonal diamond) in the range of more than or equal to 1200 $cm^{-1}$ and less than or equal to 1300 $cm^{-1}$ and maximum value $Ab_2$ of absorption (absorption by the multiphonon of the diamond) in the range of more than or equal to 1900 $cm^{-1}$ and less than or equal to 2100 $cm^{-1}$ are determined. Then, ratio $Ab_1/Ab_2$ is calculated.

Although the Fourier transform infrared spectrophotometer is not particularly limited, an exemplary Fourier transform infrared spectrophotometer is FT/IR-6000 series (trademark) provided by JASCO Corporation.

A temperature when measuring the infrared absorption spectrum in the present embodiment is a room temperature (23±5° C.) Moreover, it is assumed that the diamond polycrystal used herein to serve as a sample has a thickness of 1 mm, a degree of parallelization of less than or equal to 1°, and a measurement diameter of 1 mm (sample diameter of more than or equal to 1 mm). The infrared absorption spectrum is measured under conditions that integration is performed 10 times and a resolution value is 1 $cm^{-1}$.

<Knoop Hardness>

The diamond polycrystal of the present embodiment preferably has a Knoop hardness of more than or equal to 100 GPa and less than or equal to 150 GPa, and more preferably has a Knoop hardness of more than or equal to 120 GPa and less than or equal to 150 GPa at a room temperature. The Knoop hardness can be determined by a Knoop hardness test performed under conditions defined in JIS Z 2251:2009.

The Knoop hardness test defined in JIS Z 2251:2009 is known as one of methods for measuring hardnesses of industrial materials. The Knoop hardness test is performed to determine the hardness of a target material by pressing a Knoop indenter onto a target material under a predetermined temperature and a predetermined load (test load). In the present embodiment, the predetermined temperature is a room temperature (23° C.±5° C.), and the predetermined load is 4.9 N. The Knoop indenter refers to an indenter composed of diamond and having a shape of quadrangular prism having a bottom surface with a shape of rhomboid.

<<Tool>>

The diamond polycrystal of the present embodiment has a high hardness and an excellent breakage resistance, and can be therefore used suitably for a cutting tool, a wear-resistant tool, a grinding tool, a friction stir welding tool, or the like. That is, the tool of the present embodiment includes the above-described diamond polycrystal.

Each of the tools illustrated above may be entirely constituted of the diamond polycrystal, or only a portion thereof (for example, a cutting edge portion in the case of the cutting tool) may be constituted of the diamond polycrystal. Moreover, a coating film may be formed on a surface of each of the tools.

Examples of the cutting tool include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

Examples of the wear-resistant tool include a die, a scriber, a scribing wheel, a dresser, and the like.

Examples of the grinding tool include a grinding stone and the like.

The diamond polycrystal according to the present embodiment includes the cubic diamond and the 6H type hexagonal diamond, and includes a predetermined ratio of the 6H type hexagonal diamond. Therefore, the diamond polycrystal has an excellent breakage resistance while maintaining a high hardness.

Conventionally, a diamond polycrystal including the cubic diamond and the hexagonal diamond has been known; however, the hexagonal diamond mainly included is the 2H type hexagonal diamond (for example, WO 20121023473

(Patent Literature 1)). In the diamond polycrystal mainly including the 2H type hexagonal diamond, 2H type hexagonal diamond crystals are included in grain boundaries of the cubic diamond grains of the polycrystal. Hence, breakage tends to occur therefrom to result in a decreased breaking strength. Thus, improvement has been required.

In view of the above circumstances, as a result of diligent study, the present inventors have found it possible to produce a diamond polycrystal mainly including the 6H type hexagonal diamond of the hexagonal diamonds can be produced by increasing a pressure and a temperature simultaneously at a predetermined pressure increasing rate and a predetermined temperature increasing rate from a starting pressure and a starting temperature to a target sintering pressure and a target sintering temperature. Accordingly, the present disclosure has been completed. The 6H type hexagonal diamond exists in the cubic diamond grains in the form of twin crystals to provide an effect of preventing cleavage within the grains, thereby improving the cracking resistance. Hereinafter, a method of producing such a diamond polycrystal will be described.

<<Method of Producing Diamond Polycrystal>>

A method of producing a diamond polycrystal according to the present embodiment includes the steps of:

preparing, as a starting material, a non-diamond-like carbon material having a degree of graphitization of less than or equal to 0.6;

when assuming that a pressure is represented as P (GPa) and a temperature is represented as T (° C.), increasing the pressure and the temperature simultaneously at a pressure increasing rate of more than or equal to 0.2 GPa/minute and less than or equal to 20 GPa/minute and a temperature increasing rate of more than or equal to 300° C./minute and less than or equal to 3000° C./minute, from a starting pressure and a starting temperature satisfying $P \leq 10$ and $0 \leq T \leq 100$ to a sintering pressure and a sintering temperature satisfying $10 < P \leq 25$      Formula (1), $1000 < T \leq 2500$      Formula (2), $P \geq 0.000097 T^2 - 0.422 T + 471$      Formula (3), and $P \leq 0.000113 T^2 - 0.541 T + 663$      Formula (4); and at the sintering pressure and the sintering temperature, converting the non-diamond-like carbon material into diamond grains and performing sintering.

<Step of Preparing Non-Diamond-Like Carbon Material>

In this step, a non-diamond-like carbon material having a degree of graphitization of less than or equal to 0.6 is prepared as a starting material. The non-diamond-like carbon material is not particularly limited as long as the non-diamond-like carbon material has a degree of graphitization of less than or equal to 0.6 and is a carbon material other than diamond. The non-diamond-like carbon material preferably includes low-crystalline graphite, pyrolytic graphite, or amorphous carbon. One of these materials may be used solely or a plurality of materials thereof may be used in combination. Although the lower limit of the degree of graphitization is not particularly limited, the lower limit may be more than 0 or may be more than or equal to 0.04, for example.

The degree of graphitization (G) of the non-diamond-like carbon material is determined as follows. A spacing $d_{002}$ of a (002) plane of the graphite of the non-diamond-like carbon material is measured by performing X-ray diffraction of the non-diamond-like carbon material. A ratio g of a turbostratic structure portion of the non-diamond-like carbon material is calculated in accordance with the following formula (A):

$d_{002} = 3.440 - 0.086 \times (1 - g^2)$      Formula (A).

From the obtained ratio g of the turbostratic structure portion, the degree of graphitization (G) is calculated in accordance with the following formula (B):

$G = 1 - g$      Formula (B).

The purity of the non-diamond-like carbon material is preferably more than or equal to 99 volume %, is more preferably more than or equal to 99.5 volume %, is further preferably more than or equal to 99.9 volume %, and is most preferably 100 volume %. In other words, in order to suppress crystal grain growth, the non-diamond-like carbon material preferably includes no iron-group element metal, which is an impurity. Examples of the iron-group element metal include Fe, Co, Ni, and the like.

In order to suppress crystal grain growth and promote direct conversion to diamond, the non-diamond-like carbon material preferably include low concentrations of hydrogen, oxygen, nitrogen, and the like, which are impurities. Each of the concentrations of hydrogen, oxygen, and nitrogen in the non-diamond-like carbon material is preferably less than or equal to 1 ppm, and is more preferably less than or equal to 0.1 ppm. Moreover, a total impurity concentration in the non-diamond-like carbon material is preferably less than or equal to 3 ppm, and is more preferably less than or equal to 0.3 ppm.

Each of the concentrations of the impurities such as hydrogen, oxygen, and nitrogen in the non-diamond-like carbon material can be measured by secondary ion mass spectrometry (SIMS). As a measurement method, the impurity concentrations are measured, for example, in the following manner: "CAMECA IMS-7f" (provided by Ametek) is used for a device; $Cs^+$ is set to primary ion species; a primary acceleration voltage is set to 15.0 kV; and a detection region is set to Cr 30

<Step of Increasing Pressure and Temperature to Sintering Pressure and Sintering Temperature>

In the present step, when assuming that the pressure is represented as P (GPa) and the temperature is represented as T (° C.), the pressure and the temperature are increased simultaneously at the pressure increasing rate of more than or equal to 0.2 GPa/minute and less than or equal to 20 GPa/minute and the temperature increasing rate of more than or equal to 300° C./minute and less than or equal to 3000° C./minute, from the starting pressure and the starting temperature satisfying $P \leq 10$ and $0 \leq T \leq 100$ to the sintering pressure and the sintering temperature satisfying $10 < P \leq 25$      Formula (1), $1000 < T \leq 2500$      Formula (2), $P \geq 0.000097 T^2 - 0.422 T + 471$      Formula (3), and $P \leq 0.000113 T^2 - 0.541 T + 663$      Formula (4); and When increasing the pressure and the temperature from a starting pressure and a starting temperature satisfying $P \geq 10$ and $0 \leq T \leq 100$, a large amount of 2H type hexagonal diamond tends to be generated. When such a large amount of 2H type hexagonal diamond is generated, the breaking strength of the obtained diamond polycrystal tends to be decreased.

In one aspect of the present embodiment, it is preferable to simultaneously increase the pressure and the temperature at the above-described pressure increasing rate and temperature increasing rate from the starting pressure and the starting temperature satisfying P≤10 and 0≤T≤100 to the predetermined sintering pressure and sintering temperature while avoiding a state of pressure and temperature in which P>10 GPa and 0≤T≤100 are satisfied.

When sintering is performed at sintering pressure and sintering temperature satisfying $P<0.000097T^2-0.422T+471$, sinterability is low, with the result that a diamond polycrystal having a sufficient hardness (more than or equal to 100 GPa) tends to be less likely to be obtained. On the other hand, when sintering is performed at sintering pressure and sintering temperature satisfying $P>0.000113T^2-0.541T+663$, a sufficient amount of 6H type hexagonal diamond tends to be less likely to be obtained. Accordingly, the obtained diamond polycrystal tends to have a decreased fracture toughness, with the result that a target breakage resistance tends to be less likely to be obtained.

In the present embodiment, a manner of bringing the state from a state of normal temperature (23±5° C.) and atmospheric pressure to the above-described state of the starting pressure and the starting temperature is not limited particularly as long as no temperature decrease or pressure decrease occurs.

The upper limit of the starting pressure is less than or equal to 10 GPa, is preferably less than or equal to 9 GPa, and is more preferably less than or equal to 8 GPa. The lower limit of the starting pressure is preferably more than or equal to 3 GPa, and is more preferably more than or equal to 5 GPa.

The upper limit of the starting temperature is less than or equal to 100° C., is preferably less than or equal to 50° C., and is more preferably less than or equal to 30° C., The lower limit of the starting temperature is more than or equal to 0° C., is preferably more than or equal to 10° C., and is more preferably more than or equal to 20° C.

When increasing the pressure and temperature of the non-diamond-like carbon material, which is a source material (starting material), to the above-described predetermined sintering pressure and sintering temperature, the temperature increasing rate of temperature T is more than or equal to 300° C./minute and less than or equal to 3000° C./minute, and is preferably more than or equal to 500° C./minute and less than or equal to 2000° C./minute. In this way, generation of the 2H type hexagonal diamond is suppressed, and generation of the 6H type hexagonal diamond is promoted.

When increasing the pressure and temperature of the non-diamond-like carbon material, which is a source material (starting material), to the above-described predetermined sintering pressure and sintering temperature, the pressure increasing rate of pressure P is more than or equal to 0.2 GPa/minute and less than or equal to 20 GPa/minute, and is preferably more than or equal to 1 GPa/minute and less than or equal to 10 GPa/minute. In this way, generation of the 2H type hexagonal diamond is suppressed, and generation of the 6H type hexagonal diamond is promoted.

When increasing the pressure and temperature in the above-described manner, a ratio (ΔP1/ΔT1) of an amount of increase ΔP1 (GPa) of pressure P to an amount of increase ΔT1 of temperature T (° C.) preferably falls within a range of more than or equal to $6.67\times10^{-5}$ and less than or equal to $6.67\times10^{-2}$. In this way, the following effect can be obtained: generation of the 2H type hexagonal diamond is suppressed, and generation of the 6H type hexagonal diamond is promoted.

The upper limit of the sintering pressure is less than or equal to 25 GPa, is preferably less than or equal to 20 GPa, and is more preferably less than or equal to 18 GPa. The lower limit of the sintering pressure is more than 10 GPa, is preferably more than or equal to 11 GPa, and is more preferably more than or equal to 12 GPa.

The upper limit of the sintering temperature is less than or equal to 2500° C., is preferably less than or equal to 2400° C., and is more preferably less than or equal to 2300° C. The lower limit of the sintering temperature is more than or equal to 1000° C., is more than 1000° C., is preferably more than or equal to 1900° C., and is more preferably more than or equal to 2000° C.

<Step of Converting into Diamond Grains and Performing Sintering>

In the present step, at the above-described sintering pressure and sintering temperature, the non-diamond-like carbon material is converted into diamond grains and sintering is performed.

A sintering time at the above-described sintering pressure and sintering temperature is preferably more than or equal to 1 minute and less than or equal to 20 minutes, is more preferably more than or equal to 5 minutes and less than or equal to 20 minutes, and is further preferably more than or equal to 10 minutes and less than or equal to 20 minutes.

A high-pressure high-temperature generation apparatus used in the method of producing the diamond polycrystal according to the present embodiment is not particularly limited as long as it is possible to attain pressure and temperature conditions under which the diamond phase is thermodynamically stable; however, in order to improve productivity and workability, the high-pressure high-temperature generation apparatus is preferably a high-pressure high-temperature generation apparatus or a multi-anvil type high-pressure high-temperature generation apparatus. Moreover, a container for storing the non-diamond-like carbon material serving as the source material is not particularly limited as long as the container is composed of a material having high-pressure and high-temperature resistances. Ta, Nb, or the like is used suitably therefor, for example.

In order to prevent mixing of an impurity into the diamond polycrystal, for example, the non-diamond-like carbon material, which is a source material, is first placed in a capsule composed of a refractory metal such as Ta or Nb, is heated and sealed in vacuum, and adsorption gas and air are removed from the non-diamond-like carbon material. Thereafter, the step of increasing the pressure and temperature and the step of sintering are preferably performed.

EXAMPLES

The following describes the present embodiment more specifically by way of examples. However, the present embodiment is not limited by these examples.

Production Examples 1 to 10

<<Production of Diamond Polycrystal>>
<Step of Preparing Non-Diamond-Like Carbon Material>

First, in production examples 1 to 7 and 9, various types of graphites (pyrolytic graphites) synthesized by a pyrolytic method and having degrees of graphitization shown in Table 1 are prepared as starting materials. In a production example 8, a general isotropic graphite (particle size of 1 to 3 μm) produced by calculating coke is prepared. In a production example 10, amorphous powder (having a degree of graphitization of ≈0 and having about 0.1 mass % (1000 ppm) of hydrogen and oxygen impurities) is prepared by pulverizing the above-described general isotropic graphite very finely to have a particle size of less than or equal to 10 nm using a planetary ball mill.

<Step of Increasing Pressure and Temperature to Sintering Pressure and Sintering Temperature>

Next, each of the above-described non-diamond-like carbon materials is placed in a capsule composed of Ta, and is heated and sealed in vacuum. Then, a high-pressure high-temperature generation apparatus is used to increase the pressure and temperature at pressure increasing rate and temperature increasing rate shown in Table 1 from starting pressure and starting temperature shown in Table 1 to sintering pressure and sintering temperature shown in Table 1.

Here, in each of production examples 1 to 7, when assuming that the pressure is represented as P (GPa) and the temperature is represented as T (° C.), the pressure and the temperature are increased simultaneously at the pressure increasing rate of more than or equal to 0.2 GPa/minute and less than or equal to 20 GPa/minute and the temperature increasing rate of more than or equal to 300° C./minute and less than or equal to 3000° C./minute, from the starting pressure and the starting temperature satisfying P≤10 and 0≤T≤100 to the sintering pressure and the sintering temperature satisfying $10 < P \leq 25$  Formula (1), $1000 < T \leq 2500$  Formula (2), $P \geq 0.000097T^2 - 0.422T + 471$  Formula (3), and $P \leq 0.000113T^2 - 0.541T + 663$  Formula (4).

<Step of Converting into Diamond Grains and Performing Sintering>

After reaching the above-described sintering pressure and sintering temperature, heat treatment is performed under the pressure for a sintering time shown in Table 1, thereby converting the non-diamond-like carbon material into diamond grains and performing sintering. In this way, a diamond polycrystal is obtained. It should be noted that no sintering aid and no binder are added to the non-diamond-like carbon material.

spectrum, infrared absorption spectrum, impurity concentration, Knoop hardness, and crack generation load are measured as described below.

<Average Grain Size of Diamond Grains>

The average grain size of the diamond grains included in each of the diamond polycrystals is determined by an intercept method employing a scanning electron microscope (SEM). A specific method thereof is as follows.

First, the diamond polycrystal, which has been polished, is observed using a field-emission scanning electron microscope (FE-SEM) to obtain a SEM image.

Next, a circle is drawn on the SEM image and then eight straight lines are drawn from the center of the circle to the outer circumference of the circle in a radial manner (in such a manner that intersecting angles between the straight lines become substantially equal to one another). In this case, the observation magnification and the diameter of the circle are set such that the number of diamond grains on each straight line become about 10 to 50.

Then, the number of crystal grain boundaries of the diamond grains crossed by each of the straight lines is counted, and then the length of the straight line is divided by the number thereof to find an average intercept length. A numerical value obtained by multiplying the found average intercept length by 1.128 is regarded as the average grain size.

It should be noted that the magnification of the SEM image is ×30000. This is because with a magnification equal to or less than this magnification, the number of grains in the circle is increased, it becomes difficult to see grain boundaries to result in a wrong measurement of the grain boundaries, and a plate structure is highly likely to be included when drawing the lines. This is also because with a magnification equal to or more than this, the number of grains in the circle is too small to accurately calculate the average particle size.

For each production example, three SEM images are used in which different positions in one sample are captured. The average grain size is determined for each of the used SEM images in the above-described manner. The average value of the three obtained average grain sizes is regarded as the average grain size of the diamond grains in the production

TABLE 1

| Production Example | Non-Diamond-like Carbon Source | | Pressure Increasing and Temperature increasing Conditions | | | Sintering Conditions | |
|---|---|---|---|---|---|---|---|
| | Material Degree of Graphitization G | | Starting Pressure and Starting Temperature | Pressure Increasing Rate (GPa/Minute) | Temperature Increasing Rate (° C./Minute) | Sintering Pressure and Sintering Temperature | Sintering Time (Minute) |
| 1 | 0.04 | | 8 GPa, 27° C. | 15 | 2000 | 18 GPa, 1950° C. | 15 |
| 2 | 0.12 | | 8 GPa, 27° C. | 5 | 1000 | 16 GPa, 2050° C. | 15 |
| 3 | 0.36 | | 8 GPa, 27° C. | 10 | 1500 | 16 GPa, 2050° C. | 15 |
| 4 | 0.31 | | 8 GPa, 27° C. | 15 | 2000 | 18 GPa, 1950° C. | 15 |
| 5 | 0.38 | | 8 GPa, 27° C. | 10 | 1500 | 16 GPa, 2050° C. | 15 |
| 6 | 0.48 | | 8 GPa, 27° C. | 7 | 1000 | 16 GPa, 2100° C. | 15 |
| 7 | 0.51 | | 8 GPa, 27° C. | 5 | 1000 | 16 GPa, 2200° C. | 15 |
| 8 | 0.34 | | 16 GPa, 23° C. | 0 | 100 | 16 GPa, 2300° C. | 15 |
| 9 | 0.82 | | 16 GPa, 23° C. | 0 | 100 | 16 GPa, 2300° C. | 15 |
| 10 | ≈0 | | 16 GPa, 23° C. | 0 | 50 | 16 GPa, 1900° C. | 15 |

<<Evaluation on Characteristics of Diamond Polycrystal>>

For each of the obtained diamond polycrystals, the average grain size of the diamond grains, X-ray diffraction example. Results are shown in the column "Average Grain Size of Diamond Grains" in Table 2.

Moreover, in each of production examples 1 to 7, when observing each diamond grain using a transmission electron microscope, it can be confirmed that the 6H type hexagonal diamond exists in the form of a layer in the crystal of each of corresponding diamond grains.

<X-Ray Diffraction Spectrum>

The X-ray diffraction spectrum of each of the obtained diamond polycrystals is obtained in accordance with the X-ray diffraction method. A specific manner of the X-ray diffraction method has been described in the above section [Details of Embodiments of the Present Disclosure], and therefore will not be repeatedly described. In each of the diamond polycrystals of all the production examples, existence of the cubic diamond is confirmed in accordance with a peak pattern of the obtained. X-ray diffraction spectrum. In the X-ray diffraction spectrum of the diamond polycrystal of each of all the production examples, confirmation is made as to absence of a diffraction peak that originates from a structure other than a diamond structure and that has an integrated intensity of more than 10% with respect to a total of integrated intensities of all the diffraction peaks originating from the diamond structure.

<Infrared Absorption Spectrum>

The infrared absorption spectrum of each diamond polycrystal (sample size: 3 mm×3 mm×1 mm) serving as a sample is measured using a Fourier transform infrared spectrophotometer in a range of more than or equal to 500 $cm^{-1}$ and less than or equal to 4000 $cm^{-1}$. Next, in the obtained infrared absorption spectrum, a baseline is set such that the absorption spectrum of a wave number region in which absorption by structure defects or impurities of the diamond is not seen (region of more than or equal to 4000 $cm^{-1}$ and less than or equal to 4050 $cm^{-1}$) becomes 0. Representative infrared absorption spectrums are shown in FIG. 1. In the infrared absorption spectrum with the baseline being set, maximum value $Ab_1$ of absorption (absorption by the 6H type hexagonal diamond) in the range of more than or equal to 1200 $cm^{-1}$ and less than or equal to 1300 $cm^{-1}$ and maximum value $Ab_2$ of the absorption (absorption by the multiphonon of the diamond) in the range of more than or equal to 1900 $cm^{-1}$ and less than or equal to 2100 $cm^{-1}$ are then determined. Then, ratio $Ab_1/Ab_2$ is calculated. Results are shown in Table 2. In each of the diamond polycrystals of all the production examples, existence of the 6H type hexagonal diamond is confirmed in accordance with a pattern of the obtained infrared absorption spectrum.

<Impurity Concentrations>

SIMS is used to measure each of the concentrations of nitrogen (N), hydrogen (H), and oxygen (O) in the diamond polycrystal.

In each of the diamond polycrystals of production examples 1 to 9, a total amount of nitrogen, hydrogen, and oxygen is less than or equal to 3 ppm. In production example 10, each of hydrogen and oxygen is included on the order of 1000 ppm.

<Knoop Hardness>

Based on the conditions defined in JIS Z 2251:2009, a Knoop indenter of a micro hardness tester is used to perform a Knoop hardness test onto the diamond polycrystal. On this occasion, a measurement temperature is 23° C. and a test load is 4.9 N. Moreover, as the Knoop indenter, an indenter is used which is composed of diamond and having a shape of quadrangular prism having a bottom surface with a shape of rhomboid. Results are shown in Table 2.

<Crack Generation Load>

In order to measure the crack generation load for the diamond polycrystal, a breaking strength test is performed under the following conditions.

A spherical diamond indenter having a tip radius R of 50 μm is prepared. A load is applied to each sample at a load rate of 1 N/second at a morn temperature (23° C.). A load (crack generation load) at the moment of generation of a crack in the sample is measured. The moment of generation of a crack is measured by an acoustic emission sensor (AE sensor). This measurement is performed 5 times. The average value of the five values of the results of the measurement performed 5 times is regarded as the crack generation load of each sample. Results are shown in the column "Crack Generation Load" in Table 2. It is indicated that as the crack generation load is larger, the strength of the sample is higher and the breakage resistance thereof is more excellent.

<<Evaluations on Tool Including Diamond Polycrystal>>

<Mirror-Surface Cutting Test>

In order to find the breakage resistance of each of respective tools including the diamond polycrystals of the production examples, a ball end mill tool having a diameter of 0.5 mm is produced using each of the diamond polycrystals of the production examples, and is used to perform a mirror-surface cutting process onto an end surface of cemented carbide (WC-12% Co; grain size of 0.3 μm). Specific cutting conditions are as follows.

(Cutting Conditions)
Rotating speed: 36000 rpm
Feed rate: 120 mm/minute
Processing length: 5 μm
Width of cut: 1 μm
Processing time: 3.5 hours
Processing area: 4×5 mm.

After the cutting, the state of the cutting edge of the tool is observed to check whether or not the cutting edge is chipped. Here, the expression "cutting edge chipping occurs" means a state in which a recess is formed to have a width of more than or equal to 0.1 μm or having a depth of more than or equal to 0.01 μm. Results are shown in the column "Cutting Edge Chipping" in Table 2.

After the cutting, the state of the cutting edge of the tool is observed to measure a wear amount of the cutting edge. Here, the expression "wear amount is small" means that the wear amount is more than or equal to 0 μm and less than or equal to 20 μm, whereas the expression "wear amount is large" means that the wear amount is more than 20 μm. Results are shown in the column "Wear Amount" in Table 2.

TABLE 2

| Production Example | Average Grain Size of Diamond Grains d (nm) | $Ab_1/Ab_2$ | Knoop Hardness Hk (GPa) | Crack Generation Load Pc (N) | Cutting Edge Chipping | Wear Amount |
|---|---|---|---|---|---|---|
| 1 | 10 | 0.85 | 123 | 22 | Not Occurred | Small |
| 2 | 15 | 0.42 | 130 | 20 | Not Occurred | Small |
| 3 | 20 | 0.54 | 135 | 17 | Not Occurred | Small |
| 4 | 15 | 0.70 | 128 | 20 | Not Occurred | Small |
| 5 | 50 | 0.52 | 135 | 15 | Not Occurred | Small |
| 6 | 40 | 0.48 | 140 | 15 | Not Occurred | Small |

TABLE 2-continued

| Production Example | Average Grain Size of Diamond Grains d (nm) | $Ab_1/Ab_2$ | Knoop Hardness Hk (GPa) | Crack Generation Load Pc (N) | Cutting Edge Chipping | Wear Amount |
|---|---|---|---|---|---|---|
| 7 | 60 | 0.40 | 145 | 13 | Not Occurred | Small |
| 8 | 70 | 0.35 | 137 | 11 | Occurred | Small |
| 9 | 120 | 0.18 | 141 | 10 | Occurred | Small |
| 10 | ≤10 | 1.40 | 98.8 | 8 | Occurred | Large |

<<Analysis>>

Each of the diamond polycrystals of production examples 1 to 7 is basically composed of diamond, has a ratio $Ab_1/Ab_2$ of more than or equal to 0.4 and less than or equal to 1, and corresponds to an example of the present disclosure. Each of the diamond polycrystals of production examples 8 and 9 is basically composed of diamond, has a ratio of $Ab_1/Ab_2$ of less than 0.4, and corresponds to a comparative example. The diamond polycrystal of production example 10 is basically composed of diamond, has a ratio of $Ab_1/Ab_2$ of more than 1, and corresponds to a comparative example.

It is confirmed that each of the diamond polycrystals of production examples 1 to 7 has a high hardness, and has a larger crack generation load than those of the diamond polycrystals of production examples 8 to 10. Further, it is confirmed that in each of the tools including the respective diamond polycrystals of production examples 1 to 7, no cutting edge chipping occurs in the mirror-surface cutting test, a wear amount is small, and breakage resistance and wear resistance are excellent.

It is confirmed that each of the diamond polycrystals of production examples 8 and 9 has a high hardness, but has a crack generation load smaller than those of production examples 1 to 7. Further, it is confirmed that in each of the tools including the respective diamond polycrystals of production examples 8 and 9, cutting edge chipping occurs in the mirror-surface cutting test and breakage resistance is inferior.

It is confirmed that the diamond polycrystal of production example 10 has an insufficient hardness and has a small crack generation load. Further, it is confirmed that in the tool including the diamond polycrystal of production example 10, cutting edge chipping occurs in the mirror-surface cutting test and breakage resistance is inferior.

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A diamond polycrystal comprising diamond grains, the diamond polycrystal including a cubic diamond and a 6H type hexagonal diamond, wherein
the cubic diamond and the 6H type hexagonal diamond exist in the same or different diamond grains, and
a ratio $Ab_1/Ab_2$ is more than or equal to 0.4 and less than or equal to 1, $Ab_1$ representing a maximum value of absorption in a range of more than or equal to 1200 $cm^{-1}$ and less than or equal to 1300 $cm^{-1}$ in an infrared absorption spectrum, $Ab_2$ representing a maximum value of absorption in a range of more than or equal to 1900 $cm^{-1}$ and less than or equal to 2100 $cm^{-1}$.

2. The diamond polycrystal according to claim 1, wherein the 6H type hexagonal diamond exists in a form of a layer in each of corresponding diamond grains.

3. The diamond polycrystal according to claim 1, wherein the diamond polycrystal has a Knoop hardness of more than or equal to 100 GPa and less than or equal to 150 GPa at a room temperature.

4. The diamond polycrystal according to claim 1, wherein an average grain size of the diamond grains is more than or equal to 1 nm and less than or equal to 60 nm.

5. A tool comprising the diamond polycrystal recited in claim 1.

* * * * *